UNITED STATES PATENT OFFICE.

JOHN H. STEVENS, OF NEWARK, NEW JERSEY, ASSIGNOR TO THE CELLULOID COMPANY, OF NEW YORK, N. Y., A CORPORATION OF NEW JERSEY.

PYROXYLIN COMPOUND.

SPECIFICATION forming part of Letters Patent No. 568,106, dated September 22, 1896.

Application filed July 24, 1896. Serial No. 600,420. (No specimens.)

*To all whom it may concern:*

Be it known that I, JOHN H. STEVENS, of the city of Newark, in the county of Essex and State of New Jersey, have invented certain new and useful Improvements in Pyroxylin Compounds, which are set forth in the following specification.

The pyroxylin compounds to which the present invention relates consist of soluble pyroxylin dissolved in or combined with solvents, either of a solid or liquid nature, and such coloring-matter or pigments as are necessary to form the compound into imitations of various substances; and they are also used in the liquid state as varnishes or solutions for coating or waterproofing and for flowing on smooth surfaces to form films or sheets after evaporation of the volatile menstrua.

As to the nature of the pyroxylin and its combination with various solvents and other substances I refer to my United States Patents No. 517,987, of April 10, 1894; No. 542,692, of July 16, 1895; No. 543,108, of July 23, 1895, and No. 559,823, of May 12, 1896.

The present invention relates to the discovery and practical methods of employment of new solvents of pyroxylin and is based on the fact that the substances known as "organic urethanes" or "carbamates" are useful solvents of pyroxylin. I find that they can be successfully used to replace solid solvents like camphor and can also be used in various combinations with other ingredients used in pyroxylin compounds.

The organic urethanes or carbamates are the esters of carbamic acid. While there are many methods of making these esters, I prefer to form them by acting on fatty acid chloroformic esters with gaseous ammonia. Thus, as an instance,

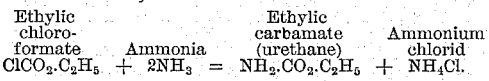

Theoretically there are carbamates corresponding to all of the alcohols, but at present they have not all been produced, and while I have used a number of these carbamates as solvents of pyroxylin I prefer and recommend the urethanes or carbamates which are derived from the monohydric monatomic series of fatty alcohols, including methyl, ethyl, propyl, butyl, and amyl alcohols—that is, Methyl carbamate, $(NH_2.CO_2.CH_3;)$
Ethyl carbamate, $(NH_2.CO_2.C_2H_5;)$
Propyl carbamate, $(NH_2.CO_2.C_3H_7;)$
Butyl carbamate, $(NH_2.CO_2.C_4H_9;)$
Amyl carbamate, $(NH_2.CO_2.C_5H_{11}.)$ My invention includes, however, the employment of all the carbamic esters, for, so far as I have ascertained, all of the urethanes which are solid substances possessing sufficiently low melting-points to dissolve pyroxylin, when heated, without decomposition are more or less useful. Besides the carbamates specially named in the preferred list I may mention among the others which I have employed benzyl carbamate, ethylidine urethane, acetyl-paraoxyphenyl urethane, (neurodin,) and acetyl-paraethoxyphenyl urethane, (thermodin.) I desire, however, to exclude from the present application the substance erroneously called "phenyl urethane" or "ethyl-phenyl carbamate," $(C_2H_5NHCOO.C_2H_5,)$ because it is identical with ethyl carbanilate, $(C_7H_6NO_2.C_2H_5,)$ and I have included this substance in a group of solvents which forms the subject-matter of a separate application, Serial No. 600,239, filed simultaneously herewith, and of which Frank C. Axtell is joint inventor and applicant with myself.

There are known combinations of urethane and other substances, but, so far as I have ascertained, I am the first to discover that whatever usefulness they may possess in connection with pyroxylin is derived from the urethane principle in the combination. For instance, chloral urethane, while not itself a solvent of pyroxylin, can be used to some extent in conjunction with camphor and other similar solvents in making pyroxylin compounds, but I do not recommend such mixtures.

The following description of the members of my preferred group of urethanes applies especially to the chemically-pure substances, but in practical work it is not always necessary that the particular urethane employed should be absolutely pure. It might, for instance, contain other urethanes or other substances which are more or less useful, or, at least, not injurious, in pyroxylin compounds. I do not limit myself, therefore, to the use of any particular urethane having the identical properties given as belonging to the pure substance. It is sufficient for the purpose of my invention if the solvent possesses enough of the urethane principle to be useful, though, of course, I recommend that the substance used be in as pure a state as possible consistent with economy. Subject to such reservations, I give the preferred group of urethanes or carbamates.

Methyl carbamate is a colorless, crystalline substance with little or no odor and has a melting-point of 52° centigrade. It is easily soluble in either alcohol or wood-spirit and fairly soluble in amyl acetate. It can be used in the same proportions as camphor. Liquid compounds containing it in proper proportions evaporate down to form hard brilliant films or coatings. In massive compositions, such as those made in masticating-rolls, methyl carbamate gives about the same plasticity to the final product as camphor; but when associated with camphor as the solid solvent it gives a plasticity to the compound which is much superior than when either methyl carbamate or camphor is used separately as a solvent, and the seasoned products can be easily manipulated in hot water. Methyl carbamate can also be employed with grain-alcohol as the liquid menstruum. For liquid compositions I would recommend the strongest liquid solvents, or those usually found suitable, such as methyl alcohol, acetone, &c.

Ethyl carbamate is a colorless, crystalline substance with little or no odor and has a melting-point of 49° to 50° centigrade. It is easily soluble in either alcohol or wood-spirit and fairly soluble in acetate of amyl. It resembles methyl carbamate in its action with the different pyroxylin compositions and usefulness in connection with camphor.

Normal propyl carbamate is a colorless, crystalline substance possessing a moderately strong but not unpleasant odor and has a melting-point of 53° centigrade. It is easily soluble in either alcohol, wood-spirit, acetone, or acetate of amyl. In pyroxylin compositions its action resembles methyl carbamate and ethyl carbamate, except that the seasoned products are not quite as plastic as those made with the other carbamates mentioned.

Butyl carbamate (isobutyl urethane) is a colorless, crystalline substance of faint, pleasant odor. It has a melting-point of 55° centigrade. It is easily soluble in either alcohol, wood-spirit, or acetate of amyl. Its action in pyroxylin compositions resembles that of the propyl carbamate.

Amyl carbamate is a colorless, crystalline substance possessing a faint, pleasant odor. It has a melting-point of 60° centigrade. It is easily soluble in either alcohol or wood-spirit, and is fairly soluble in amyl acetate. It has a greater tendency to separate from pyroxylin compounds than the methyl carbamate. It should be employed cautiously and for effects which do not involve the use of more than moderate proportions. The final result of the rolled compound, however, is a material plastic in hot water. This tendency to separation from the compound is obviated when the amyl carbamate is employed in connection with camphor.

In regard to the other carbamates mentioned—

Ethylidine urethane is a faintly-odorous substance without color. It has a melting-point of 125° to 126° centigrade. It is easily soluble in either alcohol or wood-spirit and somewhat resembles amyl carbamate in its action. The dried compositions made with it are plastic.

Benzyl carbamate is a colorless, crystalline substance having a faint, bitter-almond-like odor. It has a melting-point of 86° centigrade. It is more easily soluble in wood-spirit than in the other ordinary liquid menstrua employed. It makes very plastic compositions, but is not equal to the preferred carbamates in producing clear or brilliant effects. When used in conjunction with camphor, there is a decided improvement in the resulting compound, both in plasticity and other desired qualities.

Neurodin and thermodin give good products, and neurodin is superior to thermodin as a solvent, especially in liquid compounds. Their combinations with camphor give products of very easy plasticity.

The mixture of the different carbamates gives a compound solid solvent which, in many respects, is superior to any of the single carbamic esters. There is a marked increase in the plasticity of the pyroxylin products resulting from the use of these mixtures of the carbamates, and the difficulties mentioned in connection with amyl carbamate disappear when it is combined with others of the carbamates, especially those having the lower melting-points. All of these urethane solvents can be combined, singly or in admixture, with the series of the group of carbanilate solvents which forms the subject of the application for Letters Patent, Serial No. 600,239 hereinbefore referred to. With regard to the application of these solvents in making the various pyroxylin compounds, it is sufficient to state that in massive or rolling compounds I employ about forty to fifty parts of solid solvent to each one hundred parts of the pyroxylin, whether the solid solvent consists of a single substance, or is a mixture of two or more of the carbamates, or is formed by mixing other solid solvents with the carbamates.

The solubility of the carbamates in different menstrua is roughly given for convenience and I have mentioned no special proportions. Alcohol or wood-spirit can be employed in the rolled compositions and the usual solvents for liquid compounds. When the carbamates are used in liquid compositions, I would recommend that not more than twenty-five parts of the solid solvent be employed to each one hundred parts of the pyroxylin.

In solid compositions to be made without the employment of liquid solvents the proportions of solid solvents can be increased, but of course not to such an extent as to cause the poor effects due to excess of solvent, as is well understood.

Any heating of the compounds in such a manner as to produce a softening or solvent action constitutes their employment as solvents. The patents referred to above give sufficient instruction to the operator to render unnecessary any further description in this application.

Other solid solvents besides camphor are useful in connection with the carbamic esters. For instance, acetanilid, when used in about equal parts, forms a compound solid solvent which gives greater plasticity to the finished product than acetanilid used alone.

Having thus described my invention, what I claim, and desire to secure by Letters Patent, is—

1. The process of manufacturing pyroxylin compounds which consists in intimately mixing one or more of the carbamic esters with pyroxylin and subjecting the mixture to heat and pressure, substantially as set forth.

2. The method for the production of pyroxylin compounds which consists in intimately mixing one or more of the carbamic esters with pyroxylin and one or more solvents of pyroxylin and then subjecting the mixture to heat and pressure, substantially as set forth.

3. The method for the production of compounds of pyroxylin which consists in intimately mixing one or more of the carbamic esters with pyroxylin and one or more solid solvents of the same, and then subjecting such mixture to heat and pressure, substantially as set forth.

4. As a new composition of matter, a pyroxylin compound containing one or more of the carbamic esters and pyroxylin, substantially as described.

5. As a new composition of matter, a compound of pyroxylin consisting of one or more of the carbamic esters associated with one or more solid solvents and pyroxylin, substantially as described.

6. As a new composition of matter, a compound of pyroxylin containing one or more of the carbamic esters and one or more solvents of pyroxylin, substantially as described.

In witness whereof I have hereunto signed my name this 29th day of June, 1896.

JOHN H. STEVENS.

In presence of—
ABRAHAM MANNERS,
HORACE S. MILLER.